United States Patent [19]

Francis

[11] Patent Number: 5,248,170
[45] Date of Patent: Sep. 28, 1993

[54] EXPANSION JOINT FOR PIPING SYSTEM

[75] Inventor: Mark St. J. Francis, San Diego, Calif.

[73] Assignee: Hyspan Precision Products, Inc., Chula Vista, Calif.

[21] Appl. No.: 874,410

[22] Filed: Apr. 27, 1992

[51] Int. Cl.⁵ .............................................. F16L 27/00
[52] U.S. Cl. .................................. 285/114; 285/227; 138/120
[58] Field of Search ................ 138/120; 285/114, 227, 285/264

[56] References Cited

U.S. PATENT DOCUMENTS

| 2,314,776 | 3/1943 | Dittus et al. | 285/114 |
| 2,568,923 | 9/1951 | McNeary et al. | 285/114 |
| 2,661,963 | 12/1953 | Brown et al. | 285/114 |
| 2,822,193 | 2/1958 | Wiethüchter et al. | 285/227 |

FOREIGN PATENT DOCUMENTS

| 1089225 | 9/1960 | Fed. Rep. of Germany | 138/120 |
| 1218821 | 6/1966 | Fed. Rep. of Germany | 285/114 |
| 1146661 | 11/1957 | France | 285/227 |
| 1205263 | 2/1960 | France | 138/120 |
| 584129 | 1/1947 | United Kingdom | 285/227 |
| 2042115 | 9/1980 | United Kingdom | 285/227 |

OTHER PUBLICATIONS

Russian Engineering Journal, 1975, vol. 55, Issue 1, pp. 23-25.

Primary Examiner—Stephen F. Gerrity
Assistant Examiner—Mark Spisich
Attorney, Agent, or Firm—Brown, Martin, Haller & McClain

[57] ABSTRACT

An expansion joint assembly for use in a piping system has a central tubular bellows and opposite first and second end bellows secured to respective opposite first and second ends of the central bellows. Outer tubular ends of the respective first and second end bellows are linked to the second and first ends, respectively, of the central bellows via first and second elongate link members. The first link member is pivotally connected to the outer end of the first end bellows at one end and secured to the second end of the central bellows at its opposite end. The second link member is pivotally connected to the outer end of the second end bellows at one end and secured to the first end of the central bellows at its opposite end.

6 Claims, 2 Drawing Sheets

EXPANSION JOINT FOR PIPING SYSTEM

BACKGROUND OF THE INVENTION

This invention relates generally to joints for connecting one section of tubular piping to an adjacent piping section, and is particularly concerned with expansion joints having bellows for compensating for thermal expansion effects.

In known pressure balanced expansion joints, the end of one pipe is joined to the end of an adjacent pipe via a bellows arrangement having a central balance bellows and a pair of opposite end bellows for connection to the respective pipe ends. The central bellows has tie rings at each end and each end ring is pinned to rings secured to the outer ends of the respective end bellows. The bellows allows for thermal expansion and contraction in the piping system in the axial direction. However, since the tied rings must always remain parallel, any lateral offsets result in corresponding lateral offsets in the bellows. Such lateral displacements are very detrimental to bellows and often result in shearing of the bellows. This produces a low cycle life and restricted total offset capability. It also results in high forces being transmitted to the piping system. Any angulation of any end or tie ring will result in angulation of all bellows in the system.

SUMMARY OF THE INVENTION

It is an object of the present invention to provide a new and improved expansion joint assembly for joining two pipe sections together in a piping system.

According to the present invention, an expansion joint assembly is provided which comprises a central, tubular balance bellows having a central bellows portion and opposite tubular end portions, and first and second tubular end bellows secured to respective opposite first and second end portions of the central bellows. The outer end portions of the first and second end bellows are pivotally linked to the second and first end portions, respectively, of the central bellows via respective first and second link members.

In a preferred embodiment of the invention, annular projecting rings are provided at each end of the central bellows and at the outer ends of the end bellows. The first link member is pivotally secured to the outer end ring of the first end bellows and is secured at its opposite end to the end ring at the second end of the central bellows, while the second link member is pivotally secured at one end to the other outer end ring and is secured at its opposite end to the end ring at the first end of the central bellows. Preferably, a pair of first link members extends on opposite sides of the joint assembly and a pair of second link members extends parallel to the first pair on opposite sides of the assembly, but offset from the first pair. The first link members project through aligned enlarged openings in the end rings at the second end of the central or balance bellows, while the second link members extend through aligned, enlarged openings in the other end ring so that each link member is free to slide through the respective rings.

Since the rings are not rigidly connected together, they can rotate relative to one another, unlike conventional in-line pressure balanced expansion joints. Thus, any angulation of a ring will be imposed on the nearest bellows only and will not be transmitted to all bellows in the assembly. Lateral offsets are accommodated in this arrangement by angulation of each end bellows. The balance bellows is not angulated since the total lateral offset can be absorbed by the end bellows angulation, and thus the central balance bellows remains free to perform its main function of absorbing any axial displacements in the piping without transmitting any thrust loads to the system.

This expansion joint assembly results in lower forces being transmitted to the piping system and also extends the lifetime of the joint, since the end bellows easily absorb angular displacement. Thus, the arrangement has the capability of absorbing greater lateral offsets since the danger of shearing the bellows is significantly reduced. The joint assembly allows angulation of the bellows about the pivot axis of the link members, which is transverse to the axis of the joint assembly. Thus, lateral offsets or angular motions of the inlet or outlet pipe can only be accommodated if they occur about the same axis. In order to allow for lateral offsets in different directions in the piping system, another joint assembly may be secured in an orientation perpendicular to a first joint assembly.

This joint assembly allows angular motion of an inlet or outlet pipe to be absorbed without any angulation of the central balance bellows, thus increasing cycle life and reducing the risk of damage or shearing.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
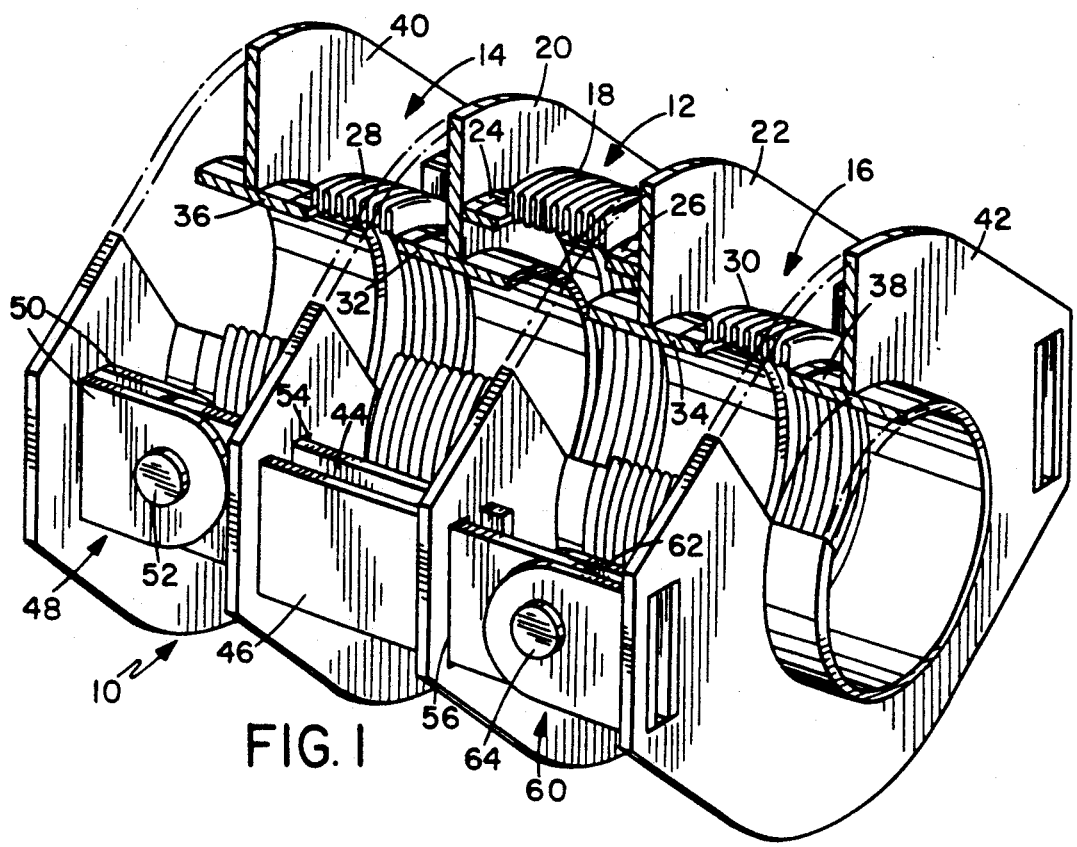
FIG. 1 is a perspective view of an expansion joint according to a preferred embodiment of the invention, with portions cut away.

The drawings illustrate an expansion joint structure 10 according to a preferred embodiment of the invention for use in piping systems to join adjacent pipe sections and absorb axial displacements as a result of thermal and other effects. The structure 10 basically comprises a central, tubular balance bellows 12 and first and second tubular end or line bellows 14, 16 secured to the respective opposite ends of the balance bellows.

A first pair of annular end plates or outwardly-projecting flanges 20, 22 are mounted at opposite ends of the central bellows between the central bellows and the respective end bellows. The end plates are welded or otherwise secured to opposite tubular ends 24, 26 of the central bellows. Each end or line bellows 14, 16 has a central bellows portion 28, 30, respectively, an inner tubular end portion 32, 34 and an outer tubular end portion 36, 38, respectively. The inner end portions 32, 34 project through the central openings of the end plates 20, 22, respectively, and are secured to the respective end plates to tie the end bellows to opposite ends of the central bellows. The outer end portions 36, 38 of the respective end bellows will be suitably secured to the ends of respective pipes to be joined. A second pair of outwardly-projecting flanges or annular end plates 40, 42 is mounted on each of the outer end portions 36, 38 of the end or line bellows 14, 16.

Figure 2:
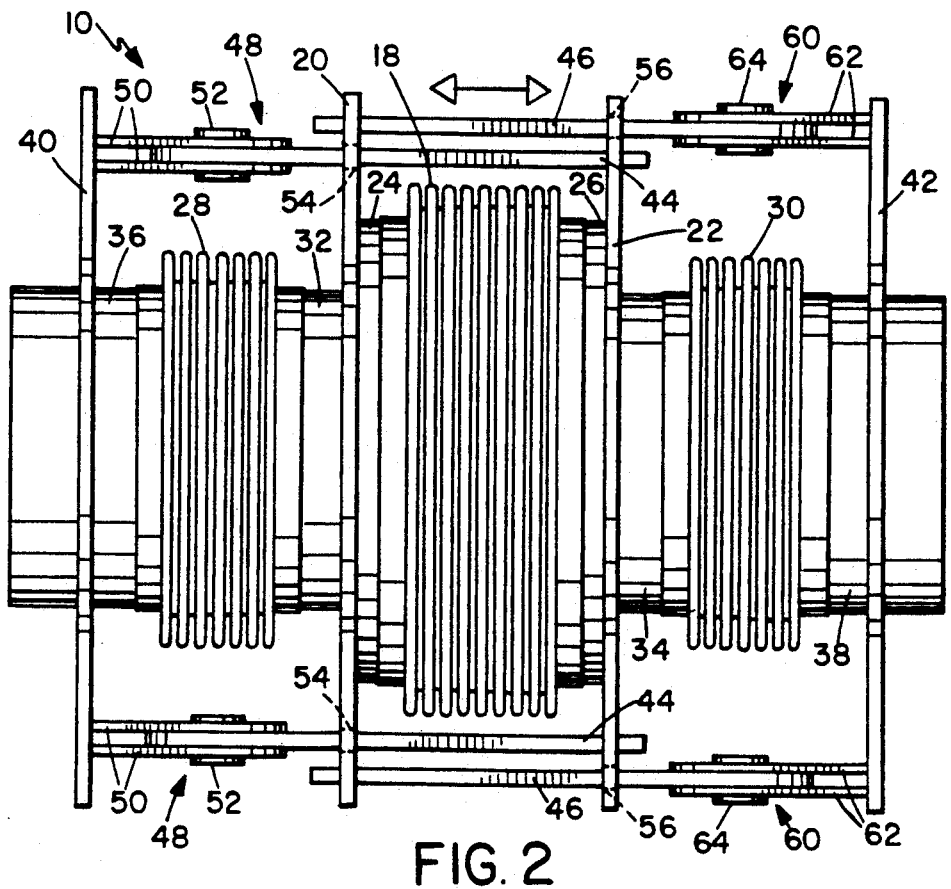
FIG. 2 is a top plan view of the joint structure.

First and second pairs of sliding link members 44, 46 pivotally link each of the end plates 40, 42 of the end bellows to the end plates 20, 22 on each end of the central bellows, as best illustrated in FIGS. 1 and 2. Each link member 44 of the first pair comprises a flat, elongate bar extending along opposite sides of the joint assembly and pivotally connected at one end to the end plate 40 via hinge connection 48. The hinge connection 48 comprises a pair of hinge lugs 50 projecting from end plate 40 with a hinge or pivot pin 52 extending between the lugs 50 and through a pivot opening in the end of link member 44. The link members 44 project from hinge connections 48 through aligned openings 54 on opposite sides of the end plate 20, and are secured at their opposite ends to the end plates 22.

Each link member 46 also comprises a flat, elongate bar pivotally connected at one end to the opposite end plate 42 and projecting through aligned openings 56 in the respective end plate 22 on opposite sides of the joint assembly which are offset from the first set of openings 52 in end plate 20 through which the first pair of link members project. Each pivot or hinge connection 60 comprises a pair of hinge lugs 62 which project from end plate 42 on opposite sides of the respective link member 46, with a hinge pin 64 extending between lugs 62 through a pivot opening in the respective link member 46. Thus, the link members 44 and 46 are free to slide through the openings in the respective end plates to accommodate axial expansions and contractions of the joint assembly.

Figure 3:
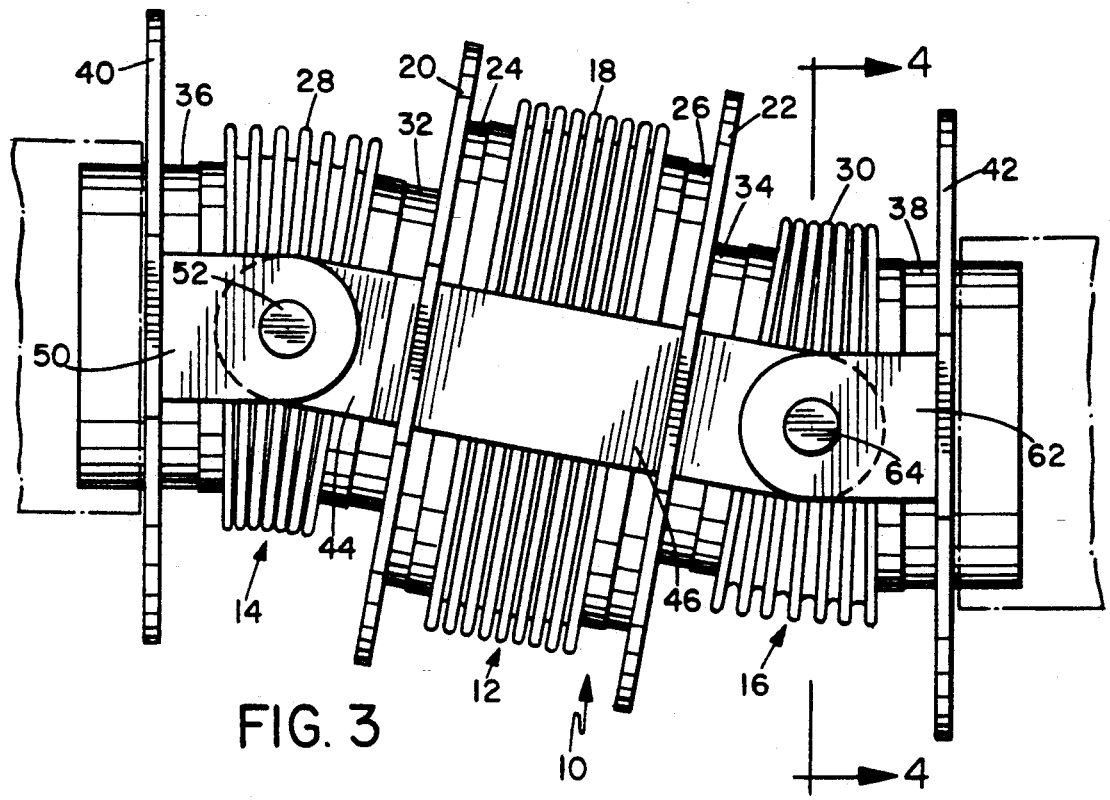
FIG. 3 is a side elevation view showing a typical offset configuration.
Figure 4:
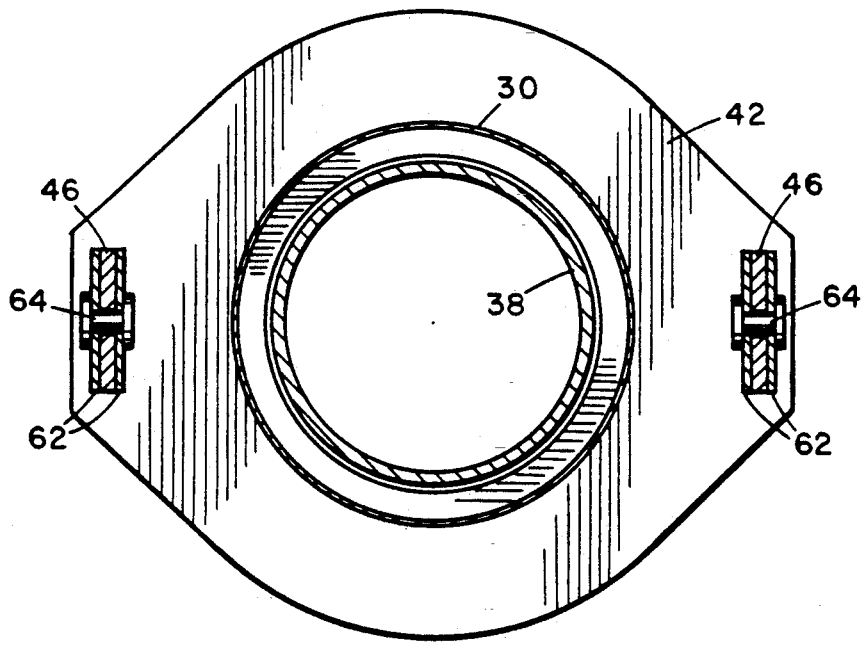
FIG. 4 is a sectional view taken on line 4—4 of FIG. 3.

This arrangement allows any axial displacements to be accommodated by expansion or contraction of the balance bellows, as indicated by the arrows in FIG. 2. Since the outer end plates are not rigidly tied to the central bellows end plates, each end plate is free to rotate independently. This permits lateral offsets to be absorbed by pivoting or angulation of each line or end bellows about the pivot axis of the respective hinge connection, in the same way as a universal expansion joint, as best illustrated in FIG. 3. It should be noted that this will also work if the pipes are angulated.

FIG. 3 illustrates a situation in which the end portion 36 of line bellows 14 is laterally offset from the end portion 38 of line bellows 16, as a result of lateral movement or rotation of one of the connected pipelines, for example. In this situation, the link members 44, 46 will pivot about the respective hinge pins 52, 64 to allow the entire central balance bellows to tilt into the angled position illustrated in FIG. 3, with no lateral offsets being applied to opposite ends of the central balance bellows, and thus no shearing forces applied to the central balance bellows. The lateral offset is absorbed by angulation of end bellows 14, 16, with the inner end portion 32 of end bellows 14 tilting downwardly with central bellows 12, causing the upper part of bellows 28 to expand while the lower part is compressed. Similarly, the inner end portion 34 of end bellows 16 will tilt to compress the upper part of bellows 30 and expand the lower part of bellows 30. Thus, bellows portions 28 and 30 are angulated rather than being laterally displaced, thus minimizing shear forces. Single bellows easily absorb angular displacement, so that this arrangement has the capability of absorbing greater lateral offsets than previously known arrangements.

With this arrangement, the central balance bellows is not affected by any lateral offsets, and remains straight. It is therefore free to perform its main function of allowing the expansion joint to absorb axial displacement without transmitting thrust loads to the piping system. This results in lower forces being transmitted to the system, higher cycle life, and greater total offset capability. Also, since the end rings rotate independently, any angulation of a ring results in that angulation being imposed only on the bellows nearest that ring.

With the illustrated joint assembly, any angulation of an inlet or outlet pipe about the axis of the respective hinge connections can be accommodated. Angulations about axes perpendicular to this axis can be accommodated by mounting a second joint assembly in the pipe line but orientated perpendicular to the first joint assembly.

Although a preferred embodiment of the invention has been described above by way of example only, it will be understood by those skilled in the field that modifications may be made to the disclosed embodiment without departing from the scope of the invention, which is defined by the appended claims.

I claim:

1. An expansion joint assembly for connecting first and second pipes, comprising:
    a central bellows having opposite first and second ends;
    first and second end bellows connected in series with the central bellows to the respective first and second ends of the central bellows, the first and second end bellows having outer ends adapted for connection to a respective end of the first and second pipes;
    at least one first elongate link member pivotally connected at one end to the outer end of the first end bellows for pivotal movement about a first pivot axis and connected at the opposite end to the second end of the central bellows; and
    at least one second elongate link member pivotally connected at one end to the outer end of the second end bellows for pivotal movement about a second pivot axis parallel to the first pivot axis, and connected at the opposite end to the first end of the central bellows.

2. The assembly as claimed in claim 1, including a pair of first link members extending on opposite sides of the central bellows between the outer end of the first end bellows and the second end of the central bellows, and a pair of second link members extending on opposite sides of the central bellows between the outer end of the second end bellows and the first end of the central bellows, the first and second pairs of link members extending alongside and offset from one another on each side of the central bellows.

3. The assembly as claimed in claim 2, including first and second annular outer end plates secured co-axially to the outer ends of the first and second end bellows, respectively, and first and second annular end plates secured co-axially to the first and second ends, respectively, of the central bellows, the first link members extending between the first outer end plate and the second end plate of the central bellows, and the second link members extending between the second outer end plate and the first end plate of the central bellows.

4. The assembly as claimed in claim 3, wherein the first end plate of the central bellows has a pair of first openings aligned with said second link members on opposite sides of said central bellows, said second link members extending through said openings, and the second end plate of the central bellows has a pair of second openings aligned with said first link members on opposite sides of said central bellows, said first link members extending through said openings, said openings being of larger dimensions than said link members for allowing relative sliding movement between said first end plate of said central bellows and said second link members, and between said second end plate of said central bellows and said first link members, respectively.

5. The assembly as claimed in claim 1, including first and second outer end flanges projecting radially outwardly from the outer ends of said first and second end bellows, respectively, and first and second inner end flanges projecting radially outwardly from the first and second ends, respectively, of said central bellows, said at least one first link member extending between the first outer end flange and the second inner end flange and said at least one second link member extending between the second outer end flange and the first inner end flange.

6. The assembly as claimed in claim 1, wherein said at least one first link member is rigidly connected to the second end of the central bellows and said at least one second link member is rigidly connected to the first end of the central bellows.

* * * * *